United States Patent Office 3,184,353
Patented May 18, 1965

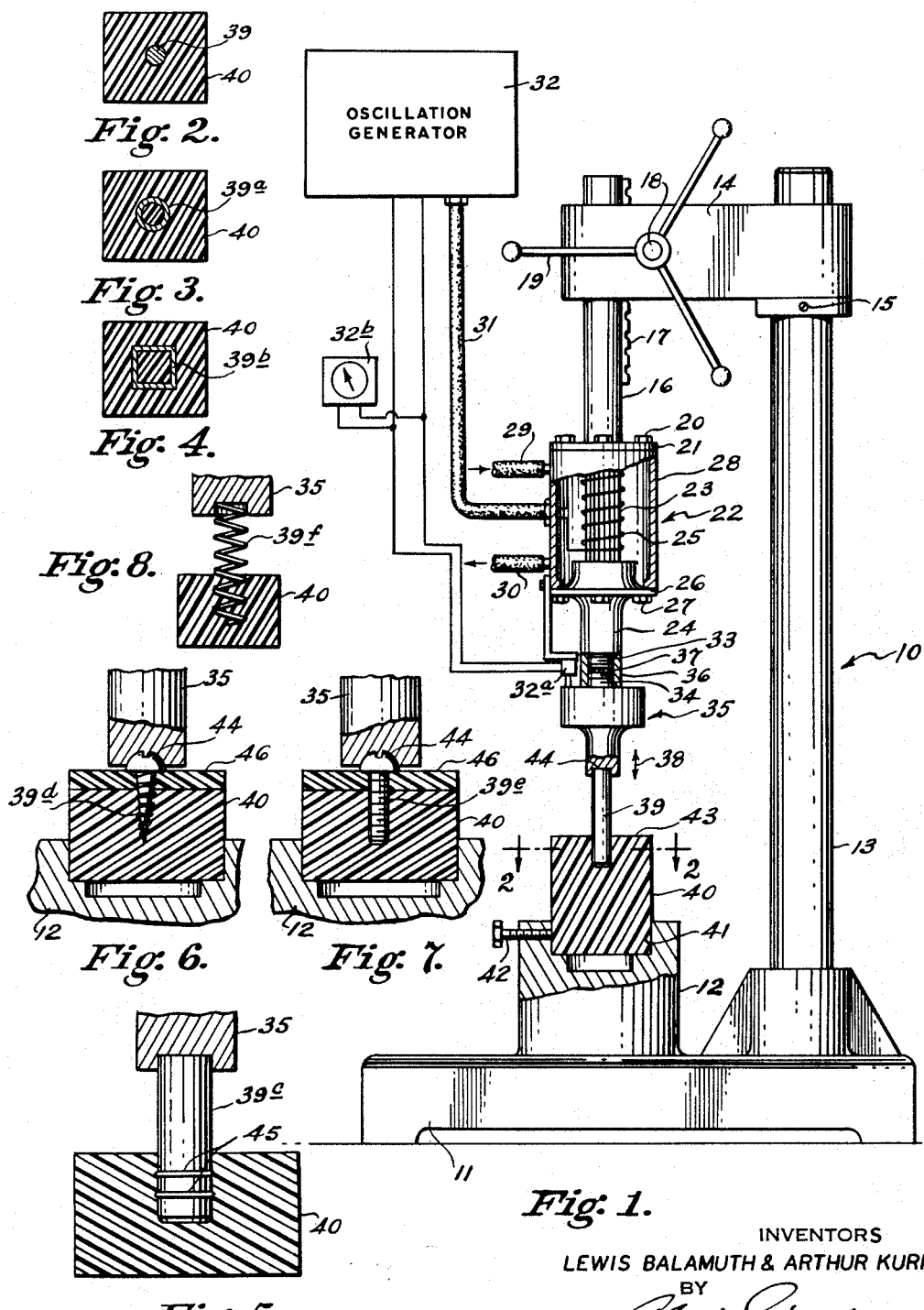

3,184,353
FASTENING TOGETHER OF MEMBERS BY HIGH
FREQUENCY VIBRATIONS
Lewis Balamuth, New York, and Arthur Kuris, Riverdale,
Bronx, N.Y., assignors to Cavitron Ultrasonics Inc.,
New York, N.Y., a corporation of New York
Filed Nov. 13, 1961, Ser. No. 151,871
14 Claims. (Cl. 156—73)

This invention relates generally to the fastening or securing together of two or more members, and more particularly is directed to the fastening together of members of which at least one is formed of a plastic, preferably thermoplastic, material.

In the fabrication of plastic articles, it is often necessary to secure together two or more plastic members, or to secure a metal or other normally non-plastic member to a plastic member. In such cases, screws have frequently been employed as the fastening means. The use of screws as fastening means requires tapped holes in the plastic member or members for their reception. When forming a tapped hole in a plastic member, it has heretofore been necessary to first drill a clearance hole in the plastic member and then form threads within the clearance hole through the use of a tapping die. Obviously, the multi-step procedure for forming the tapped holes in the plastic member and the subsequent step of inserting each screw in the related tapped hole by turning of the screw represent a substantial item of cost in the assembling together of plastic articles.

Accordingly, it is an object of the present invention to provide methods and apparatus for facilitating, and reducing the cost of fastening or securing together two or more plastic members, or a plastic member and a metal or other non-plastic member.

In accordance with an aspect of this invention, two or more members, at least one of which is formed of a plastic material, are secured together by applying a static force urging a metal or other normally non-plastic element, which may be one of the members to be secured together, into a plastic member, while introducing vibratory energy into such element at a high frequency of at least 1000 cycles per second, so that the vibratory energy causes the plastic to flow around the element which penetrates the plastic member under the urging of the applied static force. When the introduction of vibratory energy is interrupted, the plastic material fuses with the surface of the inserted element to provide a solid bonded joint therebetween.

When two or more plastic members are to be secured or fastened together, the element which is inserted by the simultaneous application of a static force and high frequency vibratory energy may be in the form of a screw so that the insertion of the screw is effective to form the plastic member or members with an exactly mating tapped hole from which the screw can be rotatably disengaged, in the usual manner, to perform its usual function as a removable fastening means. Thus, the usual procedure of drilling a clearance hole which is then tapped, and in which a screw is thereafter engaged, is replaced by a single assembly step during which the screw is merely driven into the plastic member or members and simultaneously forms its own mating tapped hope.

In the event that one of the members to be secured together is itself formed of metal or other non-plastic material, for example, is in the form of a metal pin, tube or the like, such metal member may be urged axially into the plastic member while high frequency vibratory energy is simultaneously applied to the metal member to cause the plastic material to flow and thereby permit penetration of the metal member into the plastic member. Since the cessation of the introduction of vibratory energy permits the plastic material to fuse to the surface of the metal member penetrating the plastic member, a solid bonded joint is thereby provided between the metal and plastic members, so that subsequent removal of the metal member from the plastic member will be strongly resisted even though the metal member has a smooth surface. The resistance to axial removal of the metal member from the plastic member can be enhanced by providing the surface of the metal member with ridges or serrations at a substantial angle to the direction of removal. If rotation of the inserted metal member is to be strongly resisted, the surface of the metal member inserted in the plastic member may be provided with non-circular cross-sections, or with axially extending ridges or projections.

The above, and other objects, features and advantages of the invention, will be apparent in the following detailed description of illustrative embodiments thereof which is to be read in connection with the accompanying drawing forming a part hereof, and wherein:

FIG. 1 is a side elevational view, partly diagrammatic and in section, of an apparatus embodying the invention for securing together two or more members, at least one of which is of a plastic material;

FIG. 2 is a sectional view taken along the line 2—2 on FIG. 1;

FIGS. 3 and 4 are views similar to that of FIG. 2, but in which one of the secured together members has different cross-sectional configurations;

FIG. 5 is an enlarged sectional view corresponding to a portion of FIG. 1, but in which one of the secured together members has surface projections for increasing the security of attachment;

FIGS. 6 and 7 are views similar to that of FIG. 5, but illustrating the manner in which two or more plastic members may be secured together by a wood screw or by a machine screw or bolt, respectively, in accordance with this invention; and FIG. 8 is another view similar to that of FIG. 5, but illustrating the securing of a helical spring in a plastic member in accordance with the invention.

Referring to the drawing in detail, and initially to FIG. 1 thereof, it will be seen that an apparatus 10 for fastening or securing together two or more members, at least one of which is formed of a plastic, preferably thermoplastic material, may include a stand having a base 11 supporting a chuck or mounting fixture 12 of any suitable type for holding a plastic member which is to be secured to either a metal or other non-plastic member or to another plastic member. A post 13 extends upwardly from base 11 in back of mounting fixture 12 and a head 14 is slidable on post 13 and adjustably secured at any desired location along the latter by means of a set screw 15. Head 14 extends radially forward from post 13 to overlie the chuck or mounting fixture 12 on base 11, and the free end portion of head 14 is provided with a vertical bore extending therethrough and slidably receiving a tool supporting rod 16.

In order to effect vertical movement of the tool supporting rod 16, the latter may be provided with a gear rack 17 extending therealong and in meshing engagement with a pinion (not shown) which is disposed in a suitable recess of head 14 and fixed on a laterally extending shaft 18 journalled in the latter. Radial handles 19 extend from one end of shaft 18 to permit manual rotation of the latter for either raising or lowering the tool supporting rod 16.

Suitably secured to the lower end of rod 16, for example, by screws 20 extending through a radial flange 21 which is welded or otherwise rigidly joined to rod 16, is a vertically disposed, water-cooled magnetostriction transducer 22, which is preferably of the type disclosed in United States Letters Patent No. Re. 25,033, issued August 29, 1961, to Lewis Balamuth and Arthur Kuris. The transducer 22, as diagrammatically shown, generally includes a driver unit made up of a generator 23 of mechanical vibrations and an acoustic impedance transformer 24. The generator 23 of mechanical vibrations may comprise a stack of laminations of magnetostrictive material, for example, nickel, and a diagrammatically illustrated winding 25 adapted to carry a biased, high frequency alternating energizing current. The lower ends of the laminations making up the stack of generator 23 are fixedly secured, as by welding or soldering, to the upper end of the transformer 24. The transformer 24 has an enlarged section 26 intermediate its ends in the general area of a nodal plane of motion, and this section 26 constitutes a flange secured, as by bolts 27, to a casing or enclosure 28 for the generator 23 and the upper portion of the transformer 24. An inlet hose 29 and an outlet hose 30 are connected to the enclosure or casing 28 for circulating a cooling fluid, preferably water, through the enclosure, to remove heat generated in the generator 23 during operation of the device.

A biased, high frequency alternating current is supplied to winding 25 through conductors enclosed in a flexible conduit 31 extending from a suitable oscillation generator 32, which may be of the type disclosed at page 270 of "Ultrasonic Engineering," by Alan E. Crawford, published 1955 by Butterworths Scientific Publications, London. An oscillation generator of this type is effective to supply a biased alternating current to the winding 25 at a resonant frequency of the driver unit of transducer 22, and is further effective to vary the frequency of the supplied biased, alternating current when the resonant frequency of the driver unit is varied due to changes in temperature, or changes in the loading thereof. Although the frequency of the supplied biased, alternating current is adjusted, in the oscillation generator disclosed in the above identified publication, in response to a feedback signal from a capacitor type pick-up connected to the transducer, it is to be understood that other types of pick-ups may be employed, for example, a magnetostrictive pick-up 32a providing an output signal varying with the amplitude and frequency of the vibrations and being fed back to the generator as well as actuating an amplitude meter 32b. Other existing types of oscillation generators may also be employed, for example, as disclosed in United States Letters Patent No. 2,872,578, in which adjustment of the frequency of the alternating current supplied by the oscillation generator is obtained through the use of a feedback signal which varies with the impedance of the transducer.

The lower or output end of transformer 24 is preferably provided with a depending threaded projection 33 which is coupled to a similar threaded projection 34 at the upper end of a vibration transmitting member 35 by means of an internally threaded coupling sleeve or nut 36. A thin disk 37 of copper or other deformable metal is preferably interposed between the smooth flat end surfaces of the projections 33 and 34 so that, when sleeve or nut 36 draws projections 33 and 34 axially toward each other, disk 37 ensures uninterrupted metallic contact between transformer 24 and vibration transmitting member 35 over the substantial cross-sectional area of projections 33 and 34, whereby the transmission of vibrations from transformer 24 to vibration transmitting member 35 is enhanced.

When transducer 22 is operated, by electrical oscillations supplied from generator 32, compressional waves are generated in the stack of laminations 23, the transformer 24 and transmission member 35, so as to cause vibrational movements in the vertical direction, that is, along the longitudinal axis of the transducer. For the purposes of the present invention, such vibrations preferably have a frequency in the range between approximately 1000 cycles per second and 100,000 cycles per second, and are of sizable amplitude, for example, in the range between approximately .0001 and .01 inch. In order to ensure that the maximum amplitude of vibration in the vertical direction is obtained at the lower end of transmission member 35, as indicated by the double headed arrow 38 thus ensuring the maximum transmission of working energy, the overall length of the stack of magnetostrictive laminations 23 and the transformer 24, that is, the driver unit of transducer 22, and of the vibration transmission member 35 is selected so that, at the frequency of the electrical oscillations supplied to winding 25 of the transducer, a loop of longitudinal motion of the generated compressional waves occurs at or near the lower working end of transmission member 35. In other words, the overall length of the driver unit of transducer 22 and transmission member 35 is approximately equal to an integral number of one-half wavelengths of the sound waves generated in the particular materials comprising the stack of laminations 23, the transformer 24 and the transmission member 35 at the working frequency.

In FIG. 1, the above described apparatus 10 is shown employed for the purpose of securing a metal or other normally non-plastic pin 39, which may be solid and have a circular cross-section as shown in FIG. 2, to a member 40 of plastic, preferably thermoplastic, material, for example, polyvinyl resins, vinylidines, chlorinated polyethers, polycarbonates, polyesters, plasticized cellulosic esters and ethers, methacrylates, fluorocarbons, coumarone resins, polyacetals, such as, polyoxymethylene, polyethylene, polypropylene, polystyrene, polychlorotrifluoroethylene, nylon, polytetrafluoroethylene, chlorinated rubber, and elasto-plasts, generally.

When using the apparatus 10 to secure pin or rod 39 in member 40, the latter may be held in a suitable recess 41 of the mounting fixture 12, for example, by a set screw 42, with the surface 43 of member 40 into which pin 39 is to be driven extending horizontally, that is, in a plane perpendicular to the longitudinal axis of transducer 22. While pin 39 is held perpendicular to surface 43, handles 19 are manipulated to lower transducer 22 so that the upper end of pin 39 is received in, and hence guided by a socket 44 provided at the lower end of transmission member 35. A downward static force is applied to pin 39 by further manipulation of handles 19 simultaneously with the operation of oscillation generator 32 so that the mechanical vibrations occurring at the lower end of transmission member 35 are transmitted to the upper end of pin 39 by direct contact under such static force. The vibrations of transmission member 35 also actuate pick-up 32a to produce an output signal which corresponds to the amplitude and frequency of the vibrations.

The mass of pin 39, thus coupled to transmission member 35 merely by direct contact with the latter under the applied static force, will naturally coact with the masses of the other mechanically vibrating parts of transducer 22 and with the applied static force to determine the resonant frequency of the entire mechanically vibrating unit, and the oscillation generator 32 is operative to adjust the frequency of the supplied electrical oscillations in order to ensure that the latter occur at a resonant frequency of the mechanically vibrating unit. Further, the static force applied manually through turning of handles 19 is varied or selected so as to provide the maximum amplitude of vibration as indicated by the amplitude meter 32b.

It has been found that, when the pin 39 is pressed by the static force against the surface 43 of plastic member 40 while vibratory energy is simultaneously applied to the pin, in the manner described above, the vibratory energy causes the plastic material of member 40 to flow in the regions of contact with the vibrated pin 39 so that a moderate applied static force is effective to cause the penetration of the pin 39 into the plastic member 40.

When the vibrated pin 39 has penetrated to the required depth into the plastic member 40, transmission member 35 is withdrawn upwardly from engagement with pin 39 by rotation of handles 19 in the required direction, and the operation of oscillation generator 32 is discontinued. The cessation of the introduction of vibratory energy into pin 39 permits the plastic material of member 40 to fuse with the surface of the portion of pin 39 penetrating into member 40 thereby achieving a secure bond between the metal pin 39 and the plastic member 40.

Although the pin 39 is shown in FIG. 2 to be solid and to have a circular cross-section, it will be noted that a hollow tubular pin 39a (FIG. 3) or a hollow metal member 39b (FIG. 4) of rectangular cross-section may be similarly secured to the plastic member 40. Additional security against rotation of the inserted metal member relative to the plastic member is provided by forming the metal member with non-circular cross-sections, particularly in the inserted portion thereof. Further, as shown in FIG. 5, additional security against axial withdrawal of the pin 39c from the plastic member 40 may be achieved by forming the inserted portion of the pin 39c with circumferentially extending ridges or projections 45 around which the plastic material of the member 40 flows during the insertion of pin 39c in the manner described above.

It will be apparent that the metal or other normally non-plastic member driven into the plastic member 40 by the combined action of the applied static force and vibratory energy may form one of the members which are to be secured together, as in the above described embodiments of the invention, or the inserted metal member may constitute the fastening means by which either a suitably drilled metal member is secured to a plastic member or two or more plastic members are secured to each other. More specifically, as shown in FIG. 6, a plastic member 46 may be secured to another plastic member 40 by a screw 39d which is made to pass through member 46 and into member 40 by the application of a static force and vibratory energy to the head of the screw through the vibration transmitting member 35 having a socket 44 in its lower or output end which is suitably shaped to closely receive the head of the screw. During the penetration of the screw 39d through plastic member 46 and into plastic member 40, the combined action of the static force and the vibratory energy applied to the screw causes the plastic material or materials to flow around the threads of the screw so that, when the screw is fully inserted, as in FIG. 6, the plastic material closely adheres to the surface of the screw and a tapped hole has been provided in the plastic members 40 and 46 which exactly corresponds to the configuration of the screw 39d.

It will be apparent that, when plastic members 40 and 46 are secured together by the screw 39d driven therein by the combined action of the static force and vibratory energy, the close adherence of the plastic material to the threaded body of the screw tends to avoid loosening of the latter. However, the screw 39d can be removed by turning thereof in the conventional manner so as to perform its normal function as a removable fastening means. After the screw has been thus removed, it can be reinserted or screwed into the tapped hole in the usual way. It will be obvious that the securing together of the plastic members 40 and 46 by the screw 39d driven axially therein in accordance with the present invention avoids the necessity of drilling a clearance hole and thereafter tapping such hole so as to receive the screw. Thus, screws can be employed for securing together plastic members or for securing metal parts to plastic members, while avoiding much of the labor and expense previously associated with the use of screws for such purpose.

Although the screw 39d is illustrated in FIG. 6 to be a tapered or wood screw, the method embodying the present invention can be similarly employed for assembling together plastic members 40 and 46 by a machine screw or bolt 39e (FIG. 7). It will also be noted that the combined action of the applied static force and vibratory energy mentioned above as being applied to a pin, tube, screw or bolt for the purpose of driving the latter into one or more plastic members can be similarly used for driving a nail into a plastic body, in which case the secure retention of the nail in the plastic body or member results from the fusion of the plastic material with the surface of the nail and may be further enhanced by providing the nail with the usual laterally extending serrations or identations to which the plastic material will closely conform.

As shown in FIG. 8, the combined action of applied static force and vibratory energy may be used, in accordance with the invention, for driving one end portion of a helical spring 39f into a plastic member or body 40 so as to conveniently secure together the spring 39f and the plastic body 40.

It is further to be appreciated that the transducer 22 of apparatus 10 may be embodied in a hand-held tool which is merely manually pressed against the screw or pin element to be driven into a plastic member.

The above described embodiments of the invention have referred to at least one of the members to be secured together as being formed of a thermoplastic material, but it is to be noted that the invention may be similarly applied to the securing together of members, at least one of which is of a material that is normally non-plastic but can be made plastic through the application of heat thereto. Thus, although materials such as metals or glass are not plastic at room temperatures, heat may be applied thereto to render the same more or less plastic, whereupon a pin, tube, screw or bolt may be driven therein by the combined action of an applied static force and vibratory energy as described above.

Although various embodiments of the invention have been described in detail herein with reference, where suitable, to the accompanying drawing, it is to be understood that the invention is not limited to those precise embodiments, and that various changes and modifications may be made therein by one skilled in the art without departing from the scope or spirit of the invention, except as defined in the appended claims.

What is claimed is:

1. A method of securing a non-plastic element to at least one plastic, normally solid homogeneous member, comprising applying a static force to said element urging the latter into said plastic member, and simultaneously introducing vibrations into said element parallel to the direction of said static force and at a frequency of at least 1000 cycles per second and sufficient amplitude to cause said plastic member to flow only in the areas of contact of the latter with said element so that said element is made to penetrate to a predetermined extent into into said plastic member by said static force while avoiding any other change in the shape and physical properties of said plastic member, whereupon the vibrating of said element is discontinued to halt said flow of the plastic member and obtain secure bonding of the latter to said element penetrating therein.

2. A method as in claim 1, wherein said element is in the form of a headed fastening means and is made to pass through an additional member before penetrating into said plastic member so that said element serves to secure together said plastic member and said additional member.

3. A method as in claim 2, wherein said headed fastening means is threaded at the portion thereof penetrating into said plastic member to define a tapped hole in the latter from which said headed fastening means can be unscrewed.

4. A method as in claim 1, wherein said element has a non-circular cross-section at least in the portion thereof penetrating into said plastic member to provide additional security against rotation of said element relative to said plastic member.

5. A method as in claim 1, wherein said element has projections on the surface thereof extending at substantial angles with respect to the direction of the penetration of said element into said plastic member, thereby to provide additional security against withdrawal of said element from said plastic member.

6. A method as in claim 1, wherein said member is of a material which is non-plastic at atmospheric temperatures and transformed into a plastic state at elevated temperatures; and further comprising the step of heating said member, at least in the areas of contact of the latter with said element, so as to there transform said material into the plastic state and thereby permit said simultaneous application of said static force and said vibrations to cause said penetration of said element into said member.

7. A method of securing a non-plastic element to at least one thermoplastic normally solid, homogeneous member, comprising applying a static force to said element urging the latter into said thermoplastic member, and simultaneously vibrating said element in directions parallel to said static force at a frequency of at least 1000 cycles per second with sufficient amplitude to cause said thermoplastic member to flow only in the areas of contact of the latter with said element so that said element is made to penetrate to a predetermined extent into said thermoplastic member by said static force while avoiding any other change in the shape and physical properties of said thermoplastic member, whereupon the vibrating of said element is discontinued to permit said thermoplastic member to set at said areas of contact with the element and form a secure bond with said element penetrating therein.

8. A method as in claim 7, wherein said element is in the form of a headed fastening means passing through an additional member before penetrating into said thermoplastic member so that said element secures together said additional member and said thermoplastic member.

9. A method of securing a generally elongated non-plastic element to at least one thermoplastic, normally solid homogeneous member, comprising operating an electro-mechanical transducer means so as to create longitudinal vibrations at an output end thereof at a frequency of at least 1000 cycles per second, pressing the output end of the transducer means in the direction parallel to said vibrations against one end of said element while the other end of the element is disposed against said thermoplastic member so that the vibrations transmitted through said element cause the thermoplastic member to flow only in the areas of contact of the latter with said element to permit penetration of the element into the thermoplastic member while avoiding any other change in the shape and physical properties of the latter, and removing said output end from contact with the element upon penetration of the latter into the thermoplastic member to a predetermined extent so that the thermoplastic member then sets at said areas of contact with said element and forms a secure bond with the portion of said element therein.

10. A method as in claim 9, wherein said element is in the form of a headed fastening means passing through an additional member before penetrating into said thermoplastic member so that said element secures together said additional member and said thermoplastic member.

11. A method as in claim 10, wherein said headed fastening means is threaded at the portion thereof penetrating into said thermoplastic member to define a tapped hole in the latter from which the headed fastening means can be unscrewed.

12. A method as in claim 9, wherein said element has a non-circular cross-section at least in the portion thereof penetrating into said thermoplastic member to provide additional security against rotation of said element relative to said thermoplastic member.

13. A method as in claim 9, wherein said element has an uneven surface defining recesses extending at a substantial angle to its longitudinal axis and into which the thermoplastic member flows during penetration into the latter of the element, thereby to provide additional security against longitudinal withdrawal of said element from said thermoplastic member.

14. A method as in claim 9, wherein said element is in the form of a helical spring.

References Cited by the Examiner

UNITED STATES PATENTS

| | | | |
|---|---|---|---|
| 2,052,616 | 9/36 | Gardes | |
| 2,193,413 | 3/40 | Wright. | |
| 2,335,879 | 12/43 | Ott | 18—59 |
| 2,446,818 | 8/48 | Flam | 259—72 |
| 2,555,688 | 6/51 | Flam | 259—72 |
| 2,633,894 | 4/53 | Carwile | 156—73 |
| 2,683,679 | 7/54 | Hurd et al. | 156—92 |
| 2,815,535 | 12/57 | Bodine | 18—59.2 |
| 2,829,521 | 4/58 | Kuipers | 18—59 |
| 2,942,748 | 6/60 | Anderson | 156—73 |
| 2,946,119 | 7/60 | Jones et al. | |
| 2,985,954 | 5/61 | Jones et al. | |
| 3,047,942 | 8/62 | Schneider et al. | 156—73 |

FOREIGN PATENTS 702,052  1/54  Great Britain.

OTHER REFERENCES

"Fabricating With Heat," by Robert N. Freres, Modern Plastics, November 1945, pages 142–145.

ROBERT F. WHITE, Primary Examiner.

MICHAEL V. BRINDISI, ALEXANDER H. BRODMERKEL, Examiners.